(12) United States Patent
Lee

(10) Patent No.: US 9,042,023 B2
(45) Date of Patent: May 26, 2015

(54) VIDEO WALL AND MULLION ELIMINATION STRUCTURE THEREOF

(71) Applicant: HON HAI PRECISION INDUSTRY CO., LTD., New Taipei (TW)

(72) Inventor: Han-Lung Lee, New Taipei (TW)

(73) Assignee: HON HAI PRECISION INDUSTRY CO. LTD., New Taipei (TW)

( * ) Notice: Subject to any disclaimer, the term of this patent is extended or adjusted under 35 U.S.C. 154(b) by 2 days.

(21) Appl. No.: 14/014,372

(22) Filed: Aug. 30, 2013

(65) Prior Publication Data

US 2014/0168786 A1    Jun. 19, 2014

(30) Foreign Application Priority Data

Dec. 19, 2012    (TW) .............................. 101148532 A

(51) Int. Cl.
  *G02B 27/14*    (2006.01)
  *G02B 27/10*    (2006.01)
  *G06F 3/14*    (2006.01)

(52) U.S. Cl.
  CPC .......... *G02B 27/1066* (2013.01); *G06F 3/1446* (2013.01); *G09G 2320/02* (2013.01); *G09G 2356/00* (2013.01)

(58) Field of Classification Search
  CPC .... G09F 13/22; G02B 27/1066; G02B 27/10; G02B 27/123; G02B 27/14; G02B 3/08

USPC ............. 345/1.3; 359/31, 362, 618, 629–633, 359/638, 708
See application file for complete search history.

(56) References Cited

U.S. PATENT DOCUMENTS

2013/0093647 A1*    4/2013    Curtis et al. ................... 345/1.3

* cited by examiner

*Primary Examiner* — Mahidere Sahle
(74) *Attorney, Agent, or Firm* — Novak Druce Connolly Bove + Quigg LLP

(57) ABSTRACT

An exemplary video wall includes two display panels and a mullion elimination structure. The display panels each include a main body and a bezel. The mullion elimination structure includes a triangular prism and two transparent quadrangular prisms. The triangular prism includes a first bottom and two opposite first sides. The first bottom is attached to and covers two adjacent bezels of the display panels. The transparent quadrangular prisms each include a second bottom attached to the main body of one display panel, a second side, and an opposite third side . The third side is attached to the corresponding first side of the triangular prism. The second side is coated with a transflective film for partially transmitting and partially reflecting light incident thereon. A reflective surface is formed between the first sides of the triangular prism and the second sides of the quadrangular prisms for reflecting light incident thereon.

11 Claims, 3 Drawing Sheets

VIDEO WALL AND MULLION ELIMINATION STRUCTURE THEREOF

BACKGROUND

1. Technical Field

The present disclosure relates to a video wall and a mullion elimination structure of the video wall.

2. Description of Related Art

In recent years, there has been an increase in the demand for video walls for displaying information. Video walls are often found in control centers, and sports venues and other large public places. FIGS. 1-2 show that a typical video wall 100a is comprised of several display panels 10a. The display panels 10a usually have narrow bezels 12a, which form black gaps (also called mullions) between adjacent active display areas 11a, as shown in FIG. 2.

Video processors that drive the display panels 10a can compensate for the existence of the mullions, and thereby reduce the viewed width of the mullions. Nevertheless, the mullions are still visible and affect the aesthetic appearance of the displayed content. Thus, there is a need for a video wall which can eliminate the mullions formed by the bezels 12a.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, all the views are schematic, and like reference numerals designate corresponding parts throughout the several views.

DETAILED DESCRIPTION

Embodiments of the present disclosure will now be described in detail, with reference to the accompanying drawing.

Figure 1:
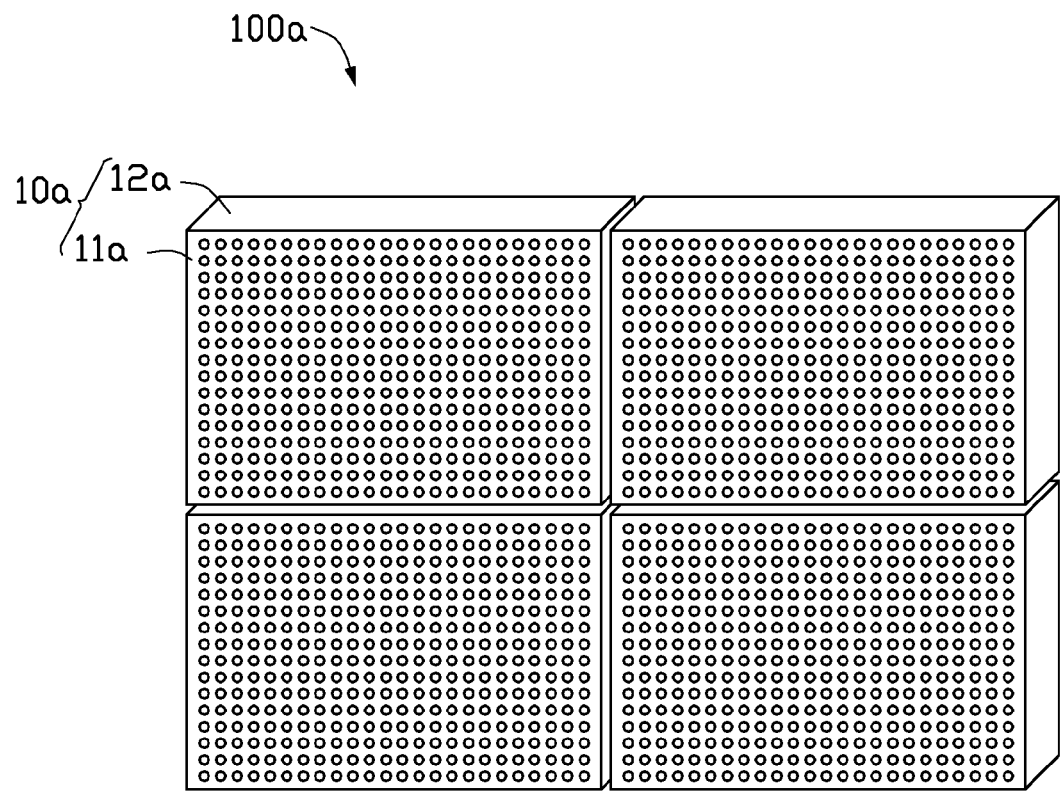
FIG. 1 is an isometric view of a conventional video wall.
Figure 2:
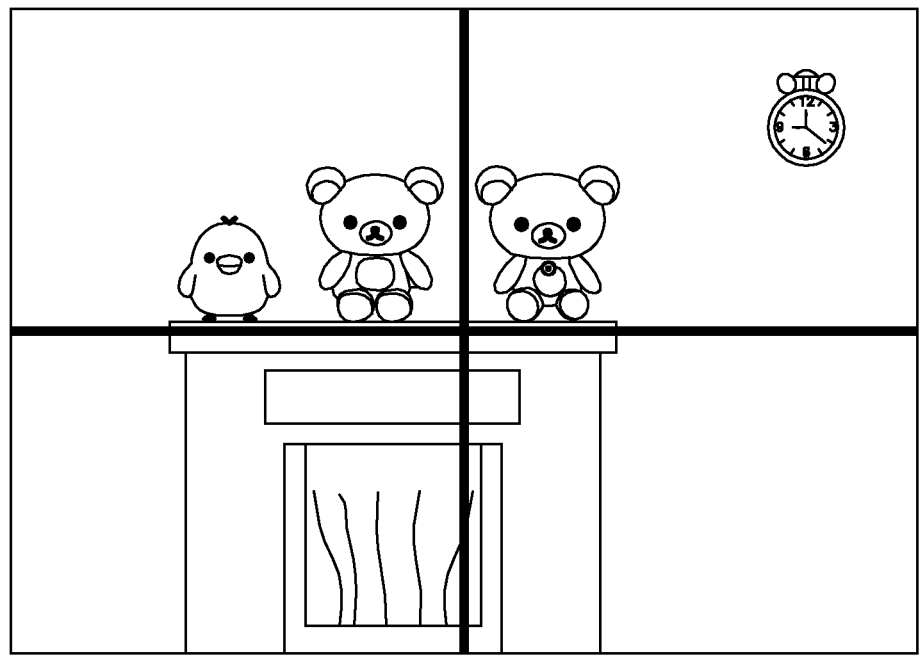
FIG. 2 is a plan view of an image displayed on the video wall of FIG. 1.
Figure 3:
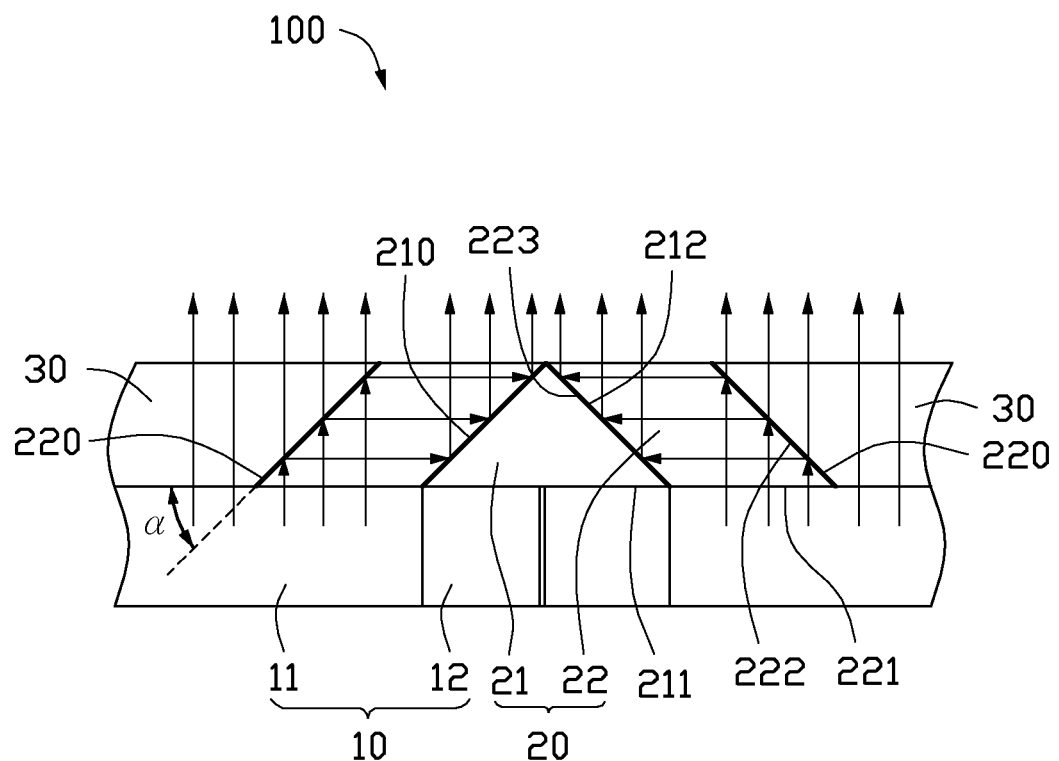
FIG. 3 is a cross-sectional view of part of a video wall according to an exemplary embodiment, showing essential optical paths thereof.

FIG. 3 shows a video wall 100 according to an exemplary embodiment. The video wall 100 includes two display panels 10, a mullion elimination structure 20, and two cover plates 30. The term "mullion(s)" refers to the junction s or border(s) bet en adjacent display devices in a video wall at which the large image being cooperatively displayed by the various display devices of the video wall is typically interrupted or distorted. The effect may be compared to viewing a scene through a window composed of an array of smaller panes of glass that are divided by vertical mullions and horizontal transoms which partially obscure the scene beyond the window Each display panel 10 includes a main body 11 for displaying information, and a bezel 12. The main body 11 is substantially rectangular, and the bezel 12 surrounds the main body 11.

The mullion elimination structure 20 includes a triangular prism 21 and two transparent quadrangular prisms 22. In the present embodiment, the triangular prism 21 is in the shape of an isosceles triangle, and the quadrangular prisms 22 are in the shape of parallelograms.

The triangular prism 21 includes a first bottom 211 and two opposite first sides 212. The first bottom 211 is attached to two adjacent bezels 12 of the display panel 10. A reflective surface 210 is directly formed on the first sides 212 for effectively reflecting light passing through the quadrangular prisms 22. In another embodiment, the reflective surface 210 may be a reflective paper attached to both of the first sides 212.

Each quadrangular prism 22 includes a second bottom 221, a second side 222, and a third side 223 opposite to the second side 222. The second bottom 221 is attached to the main body 11 of the corresponding display panel 10. The second side 222 is coated with a transflective film 220 thereon for partially transmitting and partially reflecting light. In the embodiment, an angle a defined between the second bottom 221 and the second side 222 is about 45 degrees. The third side 223 is attached to and in full contact with a corresponding first side 212 of the triangular prism 21. In the present embodiment, the third side 223 is attached to and in full contact with the reflective surface 210 formed on the corresponding first side 212 of the triangular prism 21.

Each cover plate 30 is made of transparent material. The cover plate 30 covers the remaining portion of the main body 11 of the corresponding display panel 10, and a top of the cover plate 30 is substantially coplanar with a corresponding light exit side (not labeled) of the corresponding quadrangular prism 22. In addition, the tops of the two cover plates 30 are coplanar with each other.

A portion of the light emitted by the main body 11 of each display panel 10 enters the corresponding quadrangular prism 22 via the second bottom 221 and travels to the second side 222. A portion of the light penetrates the transflective film 220 and then passes through the transparent cover plate 30. The transflective film 220 reflects the remaining portion of the light to the third side 223, where the light gets reflected by the reflective surface 210 and passes through the transparent quadrangular prism 20 to the light exit side. Finally, the light exits the light exit side to the exterior. By such process, a mullion that would otherwise be formed by the adjacent bezels 12 is substantially eliminated.

In another embodiment, the reflective surface 210 can be directly formed on the third side 223 of each quadrangular prism 20 rather than on the first sides 212 of the triangular prism 21.

While various embodiments have been described and illustrated, the disclosure is not to be construed as being limited thereto. Various modifications can be made to the embodiments by those skilled in the art without departing from the true spirit and scope of the disclosure.

What is claimed is:

1. A video wall comprising:

at least two display panels, each of the at least two display panels comprising a main body and a bezel surrounding the main body; and at least one mullion elimination structure comprising:

a triangular prism comprising a first bottom and two opposite first sides, wherein the first bottom is attached to and covers two adjacent bezels of the at least two display panels; and two transparent quadrangular prisms each comprising a second bottom attached to the main body of one of the at least two display panels, a second side, and a third side opposite to the second side, wherein the third side is attached to and in full abutment with one of the first sides of the triangular prism, and the second side is coated with a transflective film for partially transmitting and partially reflecting light incident thereon;

wherein a reflective surface is formed on the first sides of the triangular prism or on the third sides of the quadrangular prisms, the third side of each quadrangular prism is in contact with the corresponding first side of the triangular prism via the reflective surface, and the reflective surface is for reflecting light incident thereon.

2. The video wall as described in claim 1, wherein an angle defined between the second bottom and the second side of the quadrangular prism is about 45 degrees.

3. The video wall as described in claim 1, wherein the reflective surfaces are directly formed on the first sides of the triangular prism.

4. The video wall as described in claim 1, wherein the mullion elimination structure further comprises a transparent cover plate covering a portion of the main body of the at least two display panels that is not occupied by the quadrangular prisms.

5. The video wall as described in claim 4, wherein a top of the cover plate is substantially coplanar with that of the transparent quadrangular prisms.

6. A mullion elimination structure for a video wall, the video wall comprising at least two display panels, each of the at least two display panels comprising a main body and a bezel surrounding the main body, the mullion elimination structure comprising:
   a triangular prism comprising a first bottom and two opposite first sides, wherein the first bottom is attached to and covers two adjacent bezels of the at least two display panels; and
   two transparent quadrangular prisms each comprising a second bottom attached to the main body of one of the at least two display panels, a second side, and a third side opposite to the second side, wherein the third side is attached to and in full abutment with one of the first sides of the triangular prism, and the second side is coated with a transflective film for partially transmitting and partially reflecting light incident thereon;
   wherein two reflective surfaces are formed between the first sides of the triangular prism and the second sides of the quadrangular prisms, respectively, the third sides of the quadrangular prisms are in contact with the first sides of the triangular prism via the reflective surfaces, and the reflective surfaces are for reflecting light incident thereon.

7. The mullion elimination structure as described in claim 6, wherein an angle a defined between the second bottom and the second side of the quadrangular prism is about 45 degrees.

8. The mullion elimination structure as described in claim 6, wherein the reflective surfaces are directly formed on the first sides of the triangular prism.

9. The mullion elimination structure as described in claim 6, further comprising a transparent cover plate covering a portion of the main body of the at least two display panels that is not occupied by the quadrangular prisms.

10. The mullion elimination structure as described in claim 9, wherein a top of the cover plate is substantially coplanar with that of the quadrangular prisms.

11. A video wall comprising:
   two display panels, each of the display panels comprising a main body and a bezel surrounding the main body; and
   a mullion elimination structure comprising:
      a triangular prism comprising a first bottom and two opposite first sides, wherein the first bottom is attached to and covers portions of the bezels of the display panels which are located between the main bodies of the display panels; and
      two transparent quadrangular prisms each comprising a second bottom attached to the main body of one of the display panels, a second side, and a third side opposite to the second side, wherein the second side is attached to and in full abutment with one of the first sides of the triangular prism, and the third side is coated with a transflective film for partially transmitting and partially reflecting light inside the quadrangular prism incident thereon;
   wherein a reflective surface is formed between each first side of the triangular prism and the second side of the corresponding quadrangular prism, the third sides of the quadrangular prisms are in contact with the first sides of the triangular prism via the reflective surfaces, and each reflective surface is for reflecting the light reflected from the corresponding transflective film incident thereon.

* * * * *